United States Patent [19]

Sato et al.

[11] Patent Number: 5,742,039
[45] Date of Patent: Apr. 21, 1998

[54] COMMODITY MANAGEMENT SYSTEM

[75] Inventors: Miyuki Sato; Shinichi Yoshinaga; Shigeki Enoki; Hiroyasu Suzuki, all of Kawasaki, Japan

[73] Assignee: Fujitsu Limited, Kawasaki, Japan

[21] Appl. No.: 385,815

[22] Filed: Feb. 9, 1995

[30] Foreign Application Priority Data

Feb. 9, 1994 [JP] Japan .................................. 6-015087

[51] Int. Cl.$^6$ .................................................. G06K 7/10
[52] U.S. Cl. ............................ 235/462; 235/375; 235/385
[58] Field of Search .................................. 235/462, 472, 235/375, 385

[56] References Cited

U.S. PATENT DOCUMENTS 5,304,786 4/1994 Pavlidis et al. ...................... 235/462

FOREIGN PATENT DOCUMENTS 59-194261 11/1984 Japan .

OTHER PUBLICATIONS

U.S. Ser. No. 8,337,220 filed Nov. 1994 Yoshinaga.
U.S. Ser. No. 8,337,222 filed Nov. 1994 Yoshinaga et al.

Primary Examiner—Donald T. Hajec
Assistant Examiner—Karl Frech
Attorney, Agent, or Firm—Staas & Halsey

[57] ABSTRACT

A reading unit reads two dimensional bar codes which indicate at least a majority of commodity information of the commodities required for managing the commodities. A file producing unit produces a commodity master file based on the thus-read commodity information. Each code of the codes is adhered to a respective commodity of the commodities. The majority of commodity information comprises information which is determined when the commodities are shipped.

6 Claims, 14 Drawing Sheets

FIG. 7

| ISBN CODE | JAN CODE | BOOK NAME | WRITER'S NAME | PUBLISHNG COMPANY'S NAME | PUBLISHED DATE | PRICE | NUMBER OF SALES | OTHERS |
|---|---|---|---|---|---|---|---|---|
| ISBN CODE | JAN CODE | BOOK NAME | WRITER'S NAME | PUBLISHNG COMPANY'S NAME | PUBLISHED DATE | PRICE | NUMBER OF SALES | OTHERS |
| ⋮ | ⋮ | ⋮ | ⋮ | ⋮ | ⋮ | ⋮ | ⋮ | ⋮ |
| ISBN CODE | JAN CODE | BOOK NAME | WRITER'S NAME | PUBLISHNG COMPANY'S NAME | PUBLISHED DATE | PRICE | NUMBER OF SALES | OTHERS |

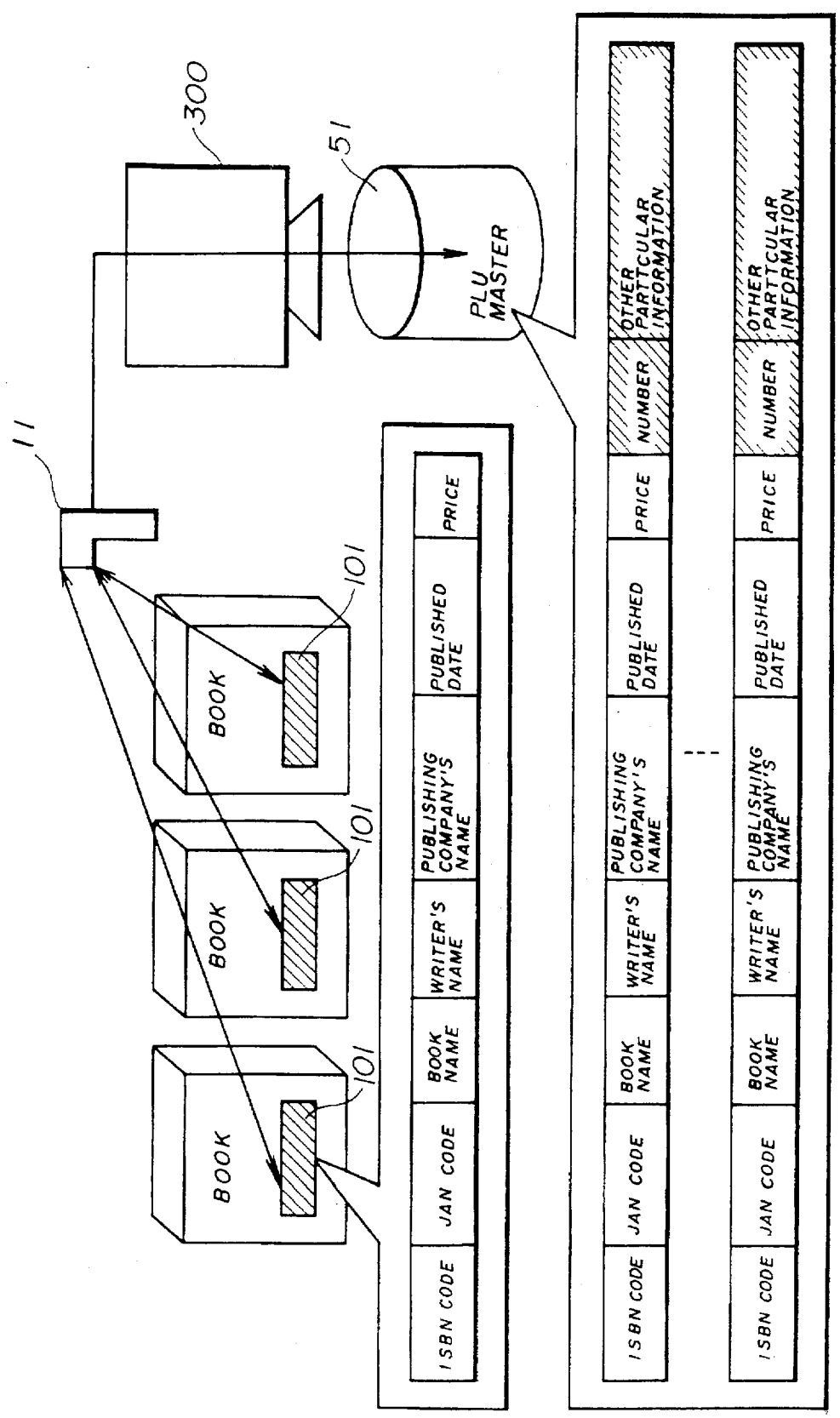

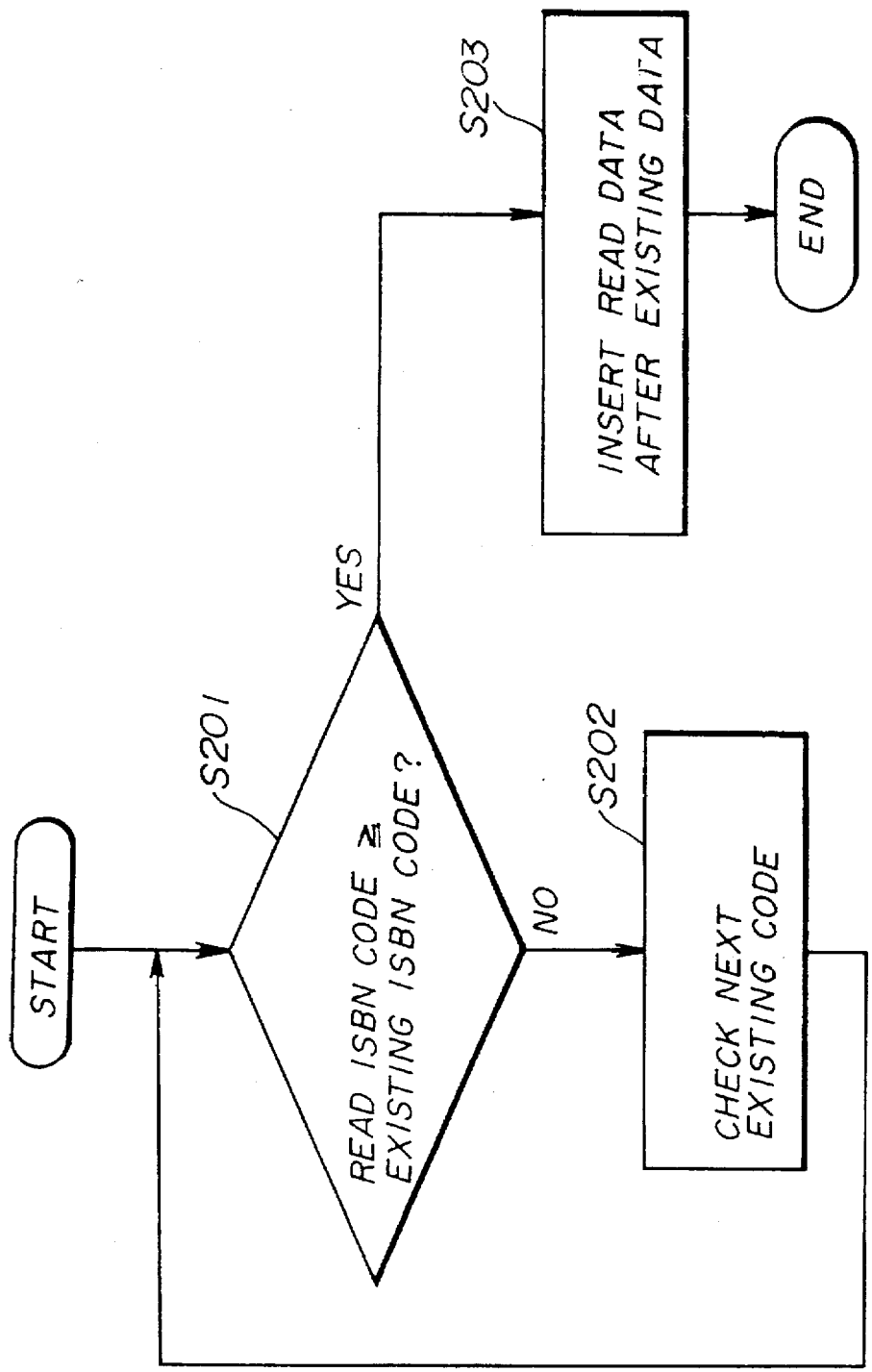

COMMODITY MANAGEMENT SYSTEM

BACKGROUND OF THE INVENTION

1. Field of the Invention

The present invention relates to a commodity management system, in particular, a commodity management system which enables high speed and efficient commodity management. Commodity management is used in the retail trade, wholesale business, and publishing business. The commodity management manages commodity sales figures, amounts ordered, and ordered amounts received.

2. Description of the Related Art

With reference to FIGS. 1 and 2, a commodity management system in the related art will now be described. The commodity management system shown in FIGS. 1 and 2 is used for, for example, commodity management of books. Structures of essential elements of a commodity management apparatus in the related art shown in FIG. 2 are approximately identical to those in a commodity management apparatus in an embodiment of the present invention shown in FIG. 6, respectively. Therefore, functions of the essential elements will be described later with reference to FIG. 6.

Recently, commodities have been diversified and also file cycles of the commodities have become shorter. Therefore, high speed and fine commodity management has been required for managing commodity sales figures, amounts ordered, ordered amounts received and so forth.

As shown in FIG. 1, the commodity management system in the related art includes the commodity management apparatus 200, a commodity master file storage 51 and a keyboard 2. The commodity master file storage 51 stores commodity master files containing commodity information of commodities to be managed, that is, a commodity code, a commodity name, a unit price, sold amount and so forth of each commodity. The keyboard 2 is used to manually input the above-mentioned commodity information so as to produce the commodity master files to be stored in the master file storage 51. In an example in which the commodities are books, the commodity information to be input includes book names, writers' names, publishers' names, publishing companys' names, published dates, book prices, ISBN codes (book codes), and JAN codes.

Sales figures, amounts ordered, ordered amounts received, and so forth, of many commodities in a retail store or the like are appropriately managed using the above commodity management system. For this purpose, the above commodity master files always have to have the latest commodity information. In order to produce such commodity master files, it is necessary for an operator to manually input the latest commodity information such as commodity codes, unit prices and so forth through the keyboard 2.

With reference to FIG. 3, an operation flow for producing the commodity master file for managing, for example, books in the commodity management apparatus 200 in the related art will now be described.

As shown in a step S1 in FIG. 3, in order to produce the commodity master files, it is necessary for an operator, with reference to labels attached onto books, to input a lot of data such as a book name, a writer's name, a publishing company's name, published dates, book prices, and so forth for each commodity through the keyboard 2. The thus-input data has to be stored as the commodity master files in an order according to the commodity codes.

The work amount required for such operations is huge and thus it is likely that operation errors may occur in the operations. Further, considerable labor and time are required for checking a result of the above operations and re-inputting performed to correct any errors found out as the result of the checking. Thus, work efficiency is very low.

In order to improve the work efficiency, the following data inputting method has been used: A character reading device (OCR) is used to read the ISBN codes (book codes) indicated on labels of books, and a bar code reader is used to read bar code data such as JAN codes (such as that shown in FIG. 9A) indicated on the labels, instead of operator's inputting the data with reference to the labels through the keyboard 2. Further, the operator inputs remaining items of the data through the keyboard 2.

There are commodities which have a lot of commodity information, such as clothing in which commodities for various colors and for various sizes are distinguished. In order to perform the commodity management for such commodities, it is necessary to input a lot of further commodity information to produce the commodity master files. For this purpose, double row bar codes used to represent a lot of commodity information have been tried. However, there are problems with this. One of the problems is that operations for reading such double row bar codes are troublesome. Further, even if such double row bar codes are used, not all the necessary commodity information can be represented by the double row bar codes.

In fact, only ten and several (i.e. less than ten) pieces of characters at the most can be represented by such a conventional bar code, which characters may be alphanumeric characters and/or Japanese letters (kana). Thus, the storing capacity is such that a sufficient amount of commodity information can not be stored in such a bar code. Therefore, even if the method using such a bar code as described above is applied, the data inputting work efficiency cannot be greatly improved. In fact, only the labor for manually inputting the data through the keyboard can be slightly reduced.

With reference to FIG. 9A, various types of conventional bar codes will now be described. The leftmost one is a JAN (UPC, EAN) type bar code which has been mainly used in the food business. The bar code to the leftmost one is an NM-7 type bar code which is used in the apparel business. The bar code to the right of the NM-7 type bar code is an ITF type bar code mainly used in the distribution industry.

Each of these conventional bar codes can store only around 20 characters, at the most, of alphanumeric characters and/or Japanese letters (kana). Therefore, in fact, only information such as that of a commodity code is stored in a bar code printed on a label attached on each commodity when the commodity is shipped. Other commodity information cannot be represented in the bar code on the label.

Further, when a particular commodity is identified using information obtained as a result of reading a bar code provided on the commodity, performance of the following operations is required: the above-mentioned master files have to be previously produced and stored in a host computer. With reference to the commodity master files, the commodity information relevant to the read bar code information has to be searched for. Thus, a commodity identification system is complicated. Further, various restrictions on using the system are present.

SUMMARY OF THE INVENTION

The present invention has been made in order to eliminate the above-mentioned problems. An object of the present invention is to provide a commodity management system which enables elimination of the above-mentioned problems using two-dimensional bar codes such as that shown in FIG. 9B. By using the commodity management system, it is possible to provide an accurate, high speed and efficient commodity management system.

A commodity management system uses reading means for reading codes which indicate at least a majority of commodity information of said commodities required for managing relevant commodities. As a result, manual inputting of commodity information can be greatly reduced. Therefore, erroneous inputting can be eliminated. Thus, checking of inputting results and correcting of the erroneous inputting can be eliminated. As a result, the inputting results do not have to partly depend on the skill of a particular operator.

It is preferable that the codes consist of two-dimensional bar codes. Thereby, high density information recording is achieved and thus, the codes can be adhered on the relevant commodities when they are shipped. As a result, when the thus-shipped commodities are stocked in a retail store, the codes can be easily read through the two-dimensional bar code reader. The thus-read data is used to produce/update the commodity master file. The only work which has to be actually executed by an operator in the retail store when the commodities are stocked is to hold the bar code reader and scan the bar codes provided on the commodities using the bar code reader. By merely executing such simple work, a large amount of the commodity information can be input and a commodity master file containing the large amount of the commodity information can be automatically produced. As a result, labor can be greatly reduced and thus it is possible to improve the efficiency of the commodity management. Further, by using the commodity master file containing the large amount of the commodity information, various useful commodity management operations can be easily performed through a personal computer. Thus, the efficiency of the commodity management can be further improved.

Other objects and further features of the present invention will become more apparent from the following detailed description when read in conjunction with the accompanying drawings.

BRIEF DESCRIPTION OF DRAWINGS

FIG. 7 shows a structure of a commodity master file shown in FIG. 6;

FIG. 10, 11A, 11B, 12 and 13 illustrate actual applications of the commodity management system in the embodiment of the present invention.

DESCRIPTION OF PREFERRED EMBODIMENT

Figure 4:
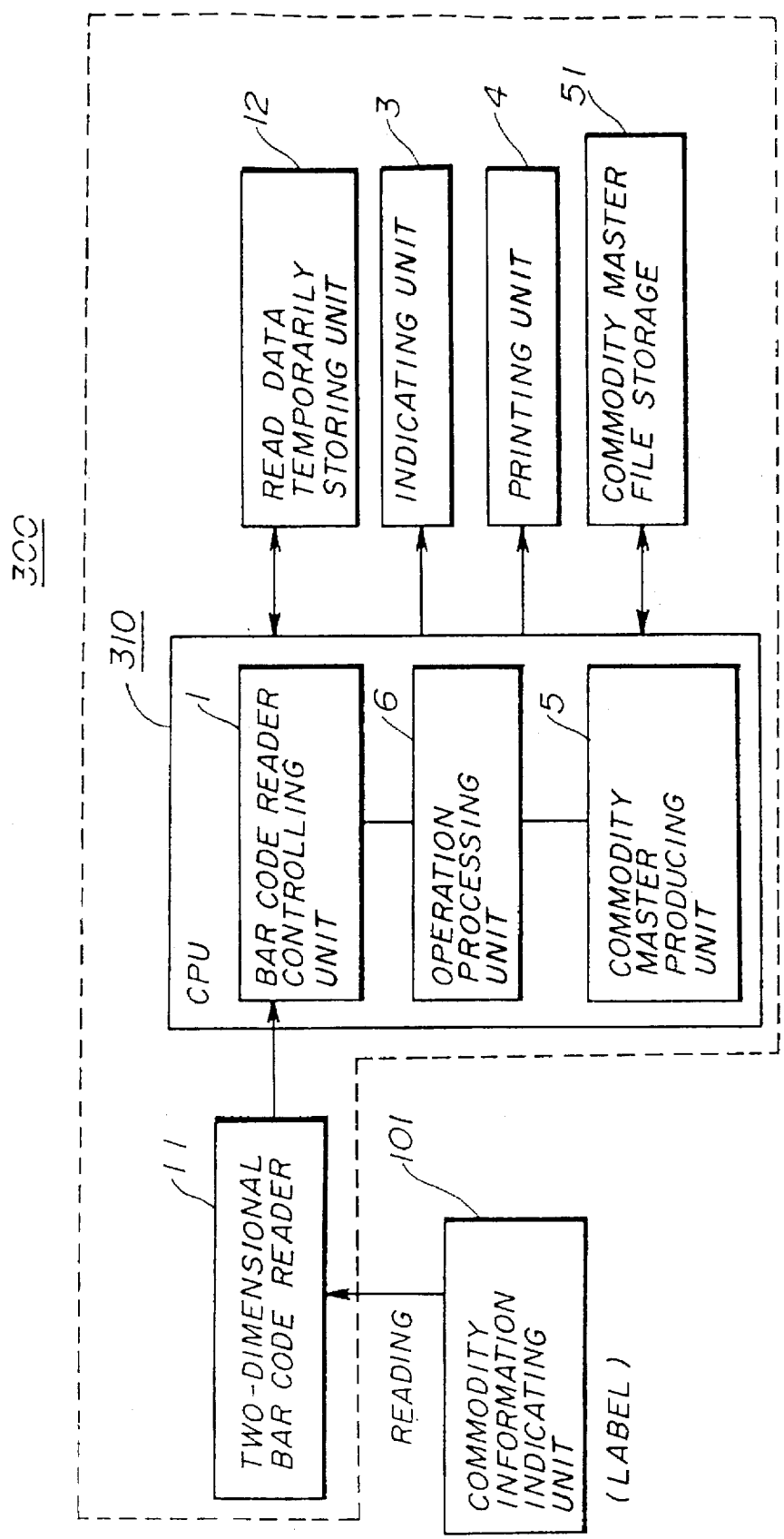
FIG. 4 shows a block diagram of a principle of a commodity management system in an embodiment of the present invention.

With reference to FIG. 4, a principle of a commodity management system in an embodiment of the present invention will be described.

The commodity management system includes a commodity information recording medium 101 and a commodity management apparatus 300. The recording medium 101 is provided for each commodity and has commodity information intensively stored therein in the form of a two-dimensional bar code. The commodity information includes information required for managing the commodity. The commodity management apparatus 300 reads the commodity information stored in the recording medium 101 and performs commodity management using the thus-read commodity information.

Further, as shown in FIG. 4, the commodity management apparatus 300 includes a CPU 310, a scanner (i.e. reading unit) 11, a commodity master producing unit 5, and a commodity master file storage 51. The reading unit 11 reads the commodity information under control of the CPU 10. The commodity master producing unit 5 produces the commodity master files based on the thus-read commodity information. The commodity master file storage 51 stores therein the commodity master files which include, for each commodity, the commodity information required for the commodity management.

The information stored in the commodity information recording medium 101 includes a code for identifying the relevant commodity and various other sorts of information required for managing the commodity in the form of the two-dimensional bar code.

Further, the commodity master files stored in the commodity master file storage 51 include the codes for identifying the commodities and numerical value information and character information indicating attributes of the commodities and information indicating sales amounts of the commodities and so forth.

Further, the commodity master producing unit 5 has an operation processing means 6. The operation processing unit 6 performs operations necessary for the commodity management. The operations include an operation to determine arrangement of the commodities and an operation for summing up amounts of the stocked commodities and amounts of the shipped commodities.

In the above-described structure, the reading means 11 reads the commodity information of each commodity, which information is stored in the commodity information recording medium (label) 101 in the form of the two-dimensional bar code. Based on the thus-read commodity information, the commodity master producing unit 5 produces the commodity master files and then stores the files in the commodity master file storage 51.

For managing of orders received, ordering, and sales, the commodity master producing unit 5 performs the commodity management by performing necessary processing based on data which is read by the reading unit 11 and data of the commodity master files stored in the storage 51.

The commodity information stored in the commodity information recording medium 101 is provided by a manufacturer of a relevant commodity. Specifically, a label on which the commodity information is printed is produced and attached on the commodity by the manufacturer when the commodity is shipped.

Figure 9A:
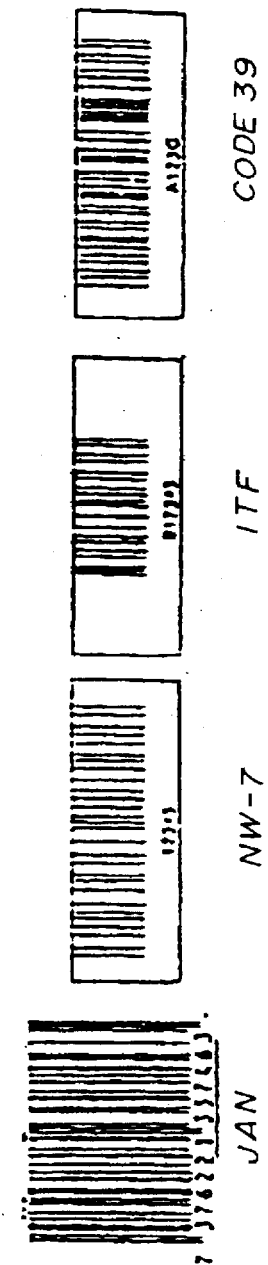
FIG. 9A shows examples of conventional types of bar codes.
Figure 9B:
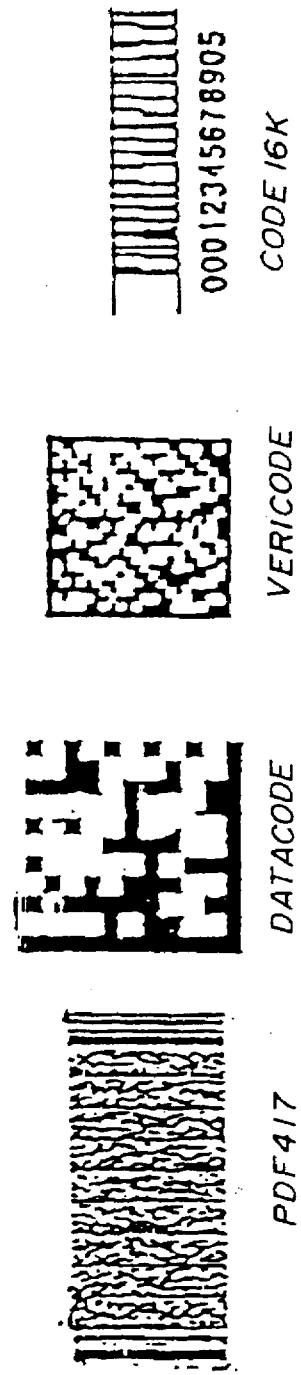
FIG. 9B shows examples of two-dimensional bar codes.

With reference to FIG. 9B, examples of the two-dimensional bar codes used in the commodity management system in the embodiment of the present invention will now be described. For example, the leftmost bar code PDF417 shown in FIG. 9B may be used. In such a two-dimensional bar code, it is possible to store an amount of character information in an area of approximately 1.5 centimeters by several centimeters. This amount of character information is one which contains approximately 500 Chinese characters (kanji) and Japanese characters (hirakana) in the form of a code. Thus, in comparison to the above-described conventional types of bar codes such as those shown in FIG. 9A, the information amount which can be stored in can be greatly increased.

How the two-dimensional bar codes such as those shown in FIG. 9B are different from the conventional bar codes such as those shown in FIG. 9A will now be described. Each of the conventional bar codes consists of vertical bars having various widths and spaces between adjacent ones of the bars, which spaces differ from each other. Thus, conventional bar codes of a same type can be distinguished from one another by measuring the distances between the vertical bars and/or spaces only along the horizontal direction. In contrast to this, each of the two-dimensional bar codes has elements therein and the arrangement and/or shapes of the elements can be varied not only along the horizontal direction but also along the vertical direction. Therefore, two-dimensional bar codes of a same type can be distinguished from one another by measuring distances between the elements not only along the horizontal direction but also along the vertical direction. Thus, the two-dimensional bar codes can store a very large data amount therein in comparison to the conventional bar codes.

A data recording method and so forth with regard to such bar codes is well known. Therefore, a description thereof will be omitted.

The present invention effectively uses the above-mentioned advantageous feature of the two-dimensional bar codes. The commodity management system in the embodiment of the present invention has the capability of instantaneously reading the commodity information in the form of the two-dimensional bar code through the reading means 11 of the commodity management apparatus 300. Further, the commodity management system has the capability of immediately converting the thus-read bar code information into character information.

Thus, by using the commodity management system in the embodiment of the present invention, the thus-input bar code information contains information necessary for the commodity management. Therefore, it is possible to obtain necessary information from the thus-input bar code information. As a result, the above-mentioned host computer, which is needed in the related art for searching for the necessary information based on the commodity code which can be input from the conventional bar code, is not necessary. In the commodity management system in the embodiment of the present invention, the commodity information necessary for producing the commodity master files can be obtained by merely reading the two-dimensional bar code. Therefore, the commodity management system performs the commodity management using the commodity master files stored in the commodity master file storage 51, which files are produced based on the thus-obtained bar code information.

The commodity information is recorded in the form of the two-dimensional bar code on each commodity. The bar bode having commodity information are printed on a label, which label is attached on each commodity by a manufacturer when the commodity is shipped. Such label producing and attaching work is performed at the same time for a lot of the commodities. As a result, it is not necessary for a sales store or a retail store to perform a work of inputting the commodity information using a keyboard. It is also not necessary for the sales store or the retail store to attach labels, on which necessary commodity information other than the commodity codes is printed, to the commodities. Thus, labor saving can be achieved and thus it is possible to further improve the efficiency of the commodity management.

Functions of the commodity management apparatus 300 shown in FIG. 4 will now be described. An operator uses the reading unit 11 to read the commodity information in the bar codes printed on the label attached to the commodity. Then, a bar code reader controlling unit 1 shown in FIG. 4 converts the character information and numeral value information in the form of the two-dimensional bar code information into character data and numeral value data. The thus-obtained data is stored in a read data temporarily storing unit 12.

After the reading of the commodity information of a lot of the commodities stored in a warehouse, the commodity master producing unit 5 uses the commodity information stored in the read data temporarily storing unit 12. Thus, the commodity master producing unit 5 puts the commodity information in order and thus produces the commodity master files. The commodity master files are stored in the commodity master file storage 51. In the above-mentioned putting the commodity information in order, the commodity information is arranged in accordance with the order of the departments in the manufacturer handling the commodities and/or an order of the commodity codes.

There may be a case where additional commodities are stocked in the warehouse or commodities among those stored in the warehouse are shipped. In such a case, the stocking or shipping is performed in accordance with a stocking or shipping specification document. According to the specification document, a worker picks up relevant commodities and causes the reading unit 11 to read the commodity information attached to the commodities. According to the thus-read commodity information, the commodity master producing unit 5 updates the commodity master files stored in the commodity master file storage 51. Thus, the commodity master files are appropriately updated in response to the stocking or shipping of the commodities.

By using the two-dimensional bar codes to store the commodity information, it is possible to compress the commodity information. Thus, a lot of information can be stored in the commodity information recording medium 101. Further, instantaneous reading of the commodity information through the reading unit 11 is possible. Therefore, the commodity master files can be easily produced and it is not likely that the producing will be affected by differences in the abilities of operators who are in charge of inputting the commodity information. As a result, errors in producing the master files can be eliminated.

Further, managing of commodity stocking or shipping can be easily performed by reading the commodity information in the form of the two-dimensional bar code through the reading unit 11. Thus, great labor saving can be achieved in the commodity management.

Thus, according to the commodity management system in the embodiment of the present invention, detailed commodity information can be processed accurately and at high speed. Therefore, a great improvement in commodity management efficiency is achieved.

Figure 5:
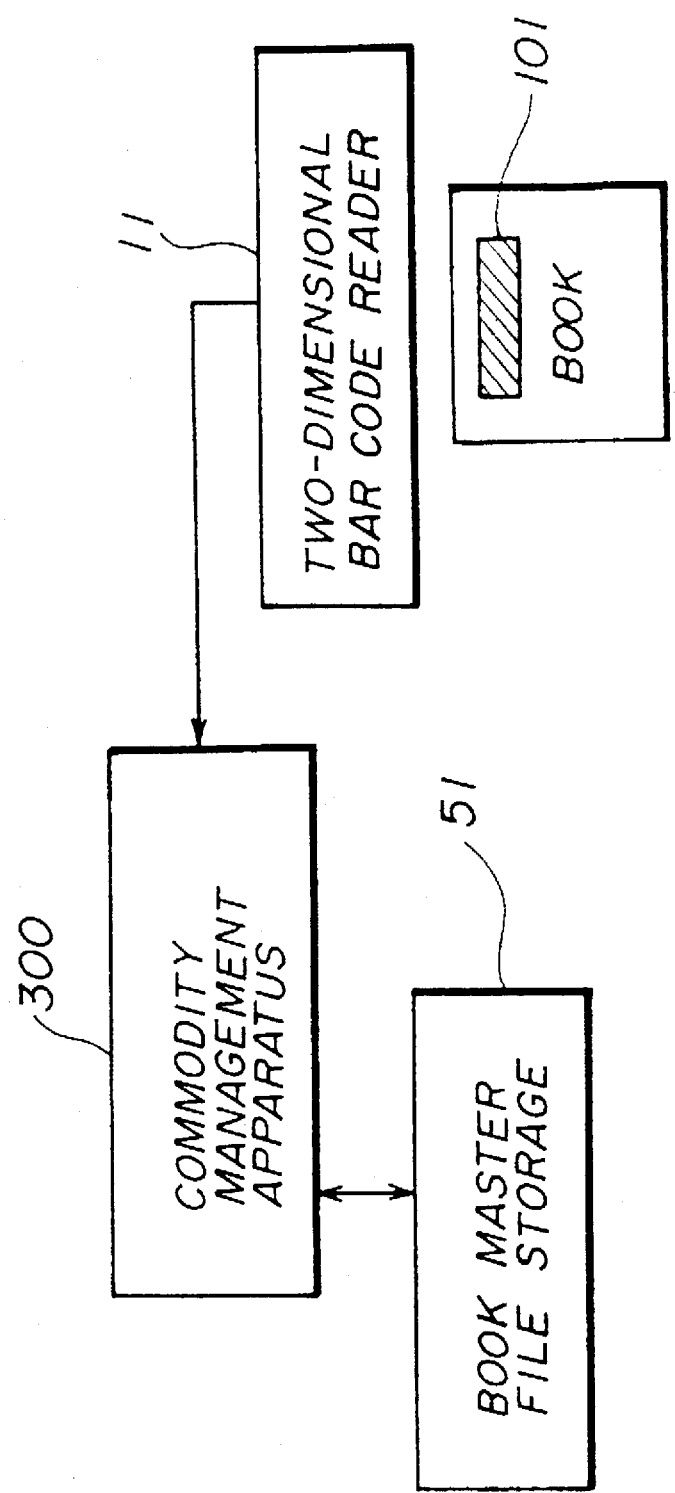
FIG. 5 shows a block diagram of a basic structure of the commodity management system in the embodiment of the present invention.

With reference to FIG. 5, the commodity management system in the embodiment of the present invention will now be described. The description concerns an example in which the commodities managed are books. The same reference numerals of the elements shown in FIG. 4 are given to elements shown in FIG. 5 which are the same as or equivalent to the elements shown in FIG. 4.

Figure 1:
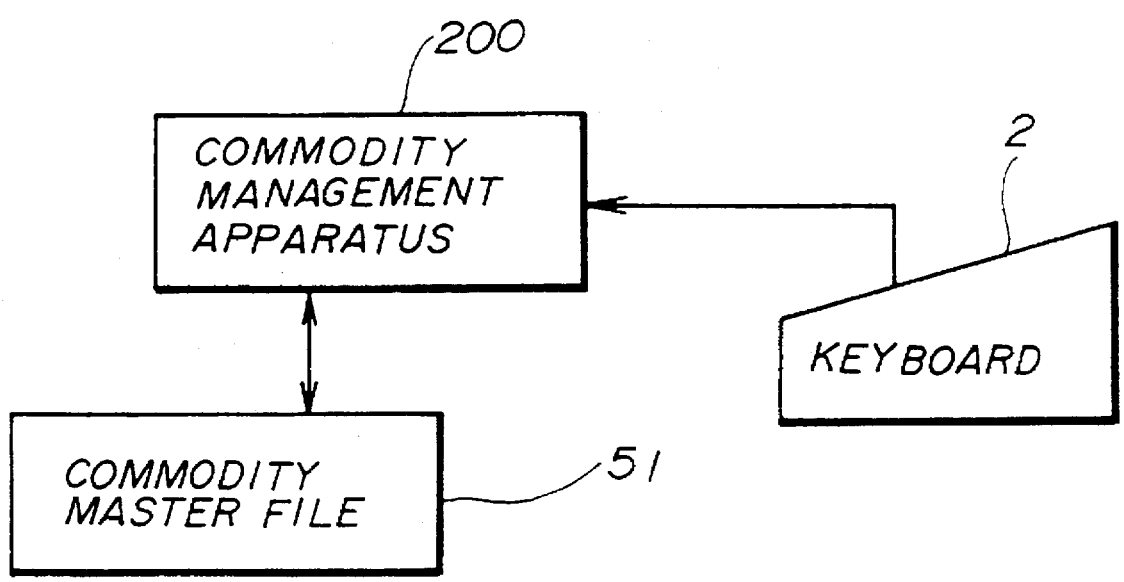
FIG. 1 shows a block diagram of a basic structure of a commodity management system in the related art.

Differences between the commodity management system shown in FIG. 5 in the embodiment of the present invention and that shown in FIG. 1 in the related art will now be described. The commodity information necessary for the commodity management in the commodity management apparatus 300 of the present invention shown in FIG. 5 is recorded in the form of the two-dimensional bar codes. Further, a two-dimensional bar code reader 11 is used to read the two-dimensional bar code commodity information to be managed. In contrast to this, the commodity information necessary for the commodity management in the commodity management apparatus 200 in the related art shown in FIG. 1 is input by an operator using the keyboard 2 as mentioned above.

The two-dimensional bar code reader 11 shown in FIG. 5 reads the two-dimensional bar code commodity information which contains character information and numerical value information. After this, the two-dimensional bar code reader 11 converts the thus-read information into character data and numerical value data, and transmits the data to the commodity management apparatus 300.

In the example in which the commodities are books, the commodity information to be recorded in the form of the two-dimensional bar code includes book names, writers' names, publishers' names, publishing companys' names, published dates, book prices, ISBN codes (book codes), and JAN codes.

Figure 6:
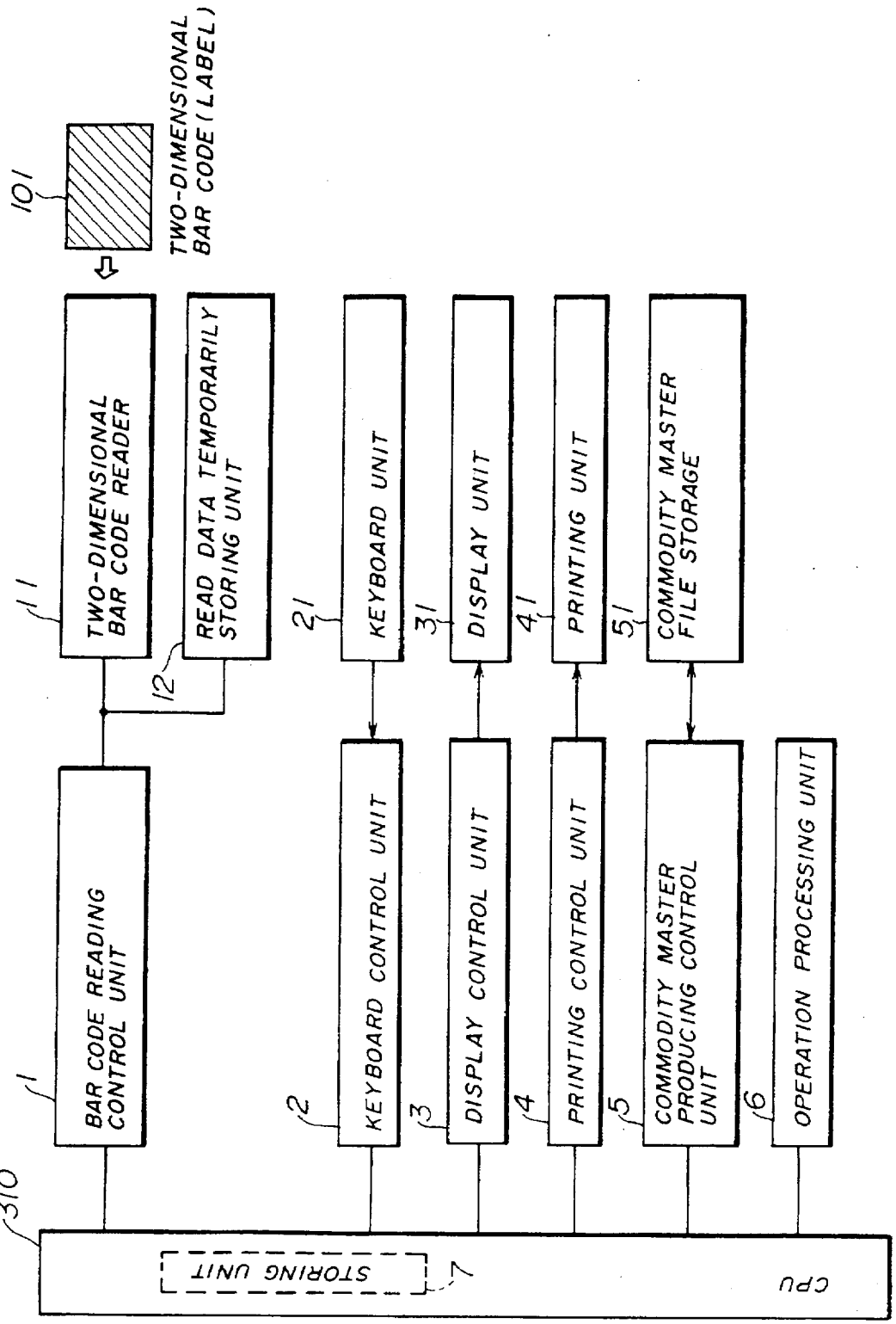
FIG. 6 shows a block diagram illustrating essential elements of a commodity management apparatus of the commodity management system shown in FIG. 5.

With reference to FIG. 6, a structure of the commodity management apparatus 300 will now be described.

A CPU 310 controls the entirety of the apparatus 300 and also processes the bar code data read through the two-dimensional bar code reader 11.

For this purpose, a two-dimensional bar code reader 11, a keyboard unit 21, a display unit 41, a printing unit 41 and so forth are connected to a bus of the CPU 310. Further, it is convenient, if necessary, that a structure of the CPU 310 is such that a communication control unit can be connected to the bus of the CPU 310, the communication control unit being used for performing communication with a higher hierarchy system.

A bar code reading control unit 1 controls bar code reading performed by the two-dimensional bar code reader 11. The bar code reading control unit 1 causes the two-dimensional bar code reader 11 to read the character information and numeric value information in the bar code form and to convert the information into character data and numeric value data. The control unit 1 stores the thus-obtained data into the read data temporarily storing unit 12.

The two-dimensional bar code reader 11 is operated by an operator so that the reader 11 reads the commodity information recorded in a two-dimensional bar code label (acting as the above-mentioned commodity information recording medium) 101. The label 101 was previously adhered to each commodity. The thus-read commodity information is stored in the read data temporarily storing unit 12 and then, if necessary, it is read out by the CPU 310 from the storing unit 12 and processed by the CPU 310.

The keyboard input control unit 2 controls data input through the keyboard unit 21 and makes the thus-input data perform a predetermined function of the data. Further, the keyboard input control unit 2 controls data communication between the keyboard unit 21 and the CPU 310. The keyboard 21 is used to input various sorts of information to the commodity management apparatus 300, which information could not be input through the two-dimensional bar code reader 11. Specifically, for example, commands to the commodity management apparatus 300, the commodity information of a commodity which has no bar code provided thereon, or the like may be input through the keyboard unit 21. Further, the keyboard unit 21 has a key for inputting a command to cancel a once input command or data and a key for inputting information indicating that an inputting operation has been completed.

The display control unit 3 controls signal communication between the display unit 31 and the CPU 310. Thus, desired information is displayed on the display unit 31. The display unit 31 is used to display various sorts of information, for example, various sorts of input information, such as the commodity code, commodity name, standard price or the like which was read through the two-dimensional bar code reader 11. The display unit 31 is also used to display states of the commodity management apparatus 300 and to display various messages to an operator.

The display unit 31 may comprise a CRT. Further, it is also possible that the display unit 31 comprises a liquid crystal display device, or a plasma display device so as to miniaturize the commodity management apparatus 300. Thus, it is possible to form the commodity management apparatus 300 to be used as a portable terminal device.

The printing control unit 4 controls signal communication between the printing unit 41 and the CPU 310. Further, the printing control unit 4 controls the printer unit 41 so as to cause the commodity information to be printed on the two-dimensional bar code labels. Further, the printing control unit 4 controls the printer unit 41 so as to print out sales results and the commodity master file. The printing unit 41 is used to print out desired information, for example, the commodity codes, commodity names, standard prices or the like. As a result of printing out such information, the commodity master files can be printed out. By this printing out, it is possible for an operator to visually recognize this information. Further, it is also possible for the printing unit 41 to be used to give messages to an operator by printing out the messages.

An operation processing unit 6 compares information of the commodity master files stored in the commodity master file storage 51 with bar code information. The commodity master files were produced from the commodity information read in through the two-dimensional bar code reader 11 (and through the keyboard unit 21, if necessary). The bar code information is obtained as a result of reading the two-dimensional bar code label 101 through the two-dimensional bar code reader 11. By a processing performed through the operation processing unit 6, sales management operations, in which commodity stocking/shipping management operations and sales money amount calculation operations are performed, order receiving/order management operations, and so forth are performed.

Results of the processing by the operation processing unit 6 are transferred to the display control unit 3 and displayed on the display unit 31. Further, if necessary, the results are printed out through the printing unit 41. Thus, messages or the like are printed out.

A commodity master producing control unit 5 produces the commodity master files based on the commodity information read in from the two-dimensional bar code labels adhered to commodities. The thus-produced commodity master files are stored in the commodity master file storage 51.

A storing unit 7 provided in the CPU 310 includes a ROM and a RAM. Computer programs for operating the commodity management apparatus 300 are stored in the ROM. Various sorts of preset information, information generated during processes, and/or the like are temporarily stored in the RAM. The computer programs stored in the ROM are loaded in the RAM. The CPU 310 operates in accordance with the computer programs thus loaded in the RAM. Thus, the CPU 310 controls the entirety of the commodity management apparatus 300.

The storing unit 7 includes a storage area for storing control information required for various sorts of processing, output information relevant to input data and/or the like. The storing unit 7 also includes a storage area for storing information concerning registered commodities, calculated sales money amount information, and/or the like.

In the above-described structure, how the commodity management apparatus 300 operates when an order is received/ordering is performed will now be described. The two-dimensional bar codes printed on an order receiving/ordering specification are read through the two-dimensional bar code reader 11. The thus-read data is stored in the read data temporarily storing unit 12.

The commodity master producing control unit 5 is activated as a result of an instruction to perform an order receiving/order operation being given. The control unit 5 then reads out a commodity master file previously produced for a relevant commodity among the commodity master files stored in the commodity master file storage 51. Subsequently, the control unit 5 reads out the data, which was stored in the read data temporarily storing unit 12 as mentioned above. Based on the data thus read out from the storing unit 12, the commodity master file, which was read out from the commodity master file storage 51 as mentioned above, is updated.

Specifically, for example, it is assumed that a received order amount is updated. In this case, an existing received order money amount sum is read from a commodity master file of a relevant commodity. Further, a received order money amount at this time is read from a relevant order receiving specification. The received order money amount thus-read at this time is added to the thus-read existing received order money amount. The resulting received order money amount sum is stored in the relevant commodity master file stored in the commodity master file storage 51. Thus, the data of the commodity master file is updated.

Then, the thus-updated data is transferred to the display control unit 3 and displayed on the display unit 31. Thus, an operator can recognize the updating of the commodity master file. Further, if necessary, the thus-updated data may be transferred to the printing control unit 4 and printed out through the printing unit 41.

An operating procedure to be performed when the commodity master files are updated in response to a commodity stocking/shipping case is essentially the same as the procedure in the above-described order receiving/ordering case. However, in the stocking/shipping case, commodity information of stocking/shipping commodities is input directly through the two-dimensional bar code reader 11. That is, the two-dimensional bar code labels adhered to the relevant commodities are directly read through the reader 11.

How a sort of commodity management managing numbers of sales or the like is performed will now be described. In this sort of commodity management, a total money amount of sales and a total number of sales and so forth are updated each time when a transaction is performed. In a case of such a sort of commodity management of sales management, for example, a totaling switch provided on the commodity management apparatus 300 is operated for each transaction. By operating the totaling switch, a computer program for sales management is executed. Thus, the total money amount of sales and the total number of sales are updated for each transaction.

Further, the two-dimensional bar code reader 11 is used to read the two-dimensional bar codes of the two-dimensional bar code labels adhered on the commodities handled in the relevant transaction. The thus-read data is temporarily stored in the read data temporarily storing unit 12.

The operation processing unit 6 obtains commodity information, such as commodity codes, prices and so forth required for this sort of commodity management, from the data temporarily stored in the storing unit 12. Then, the operation processing unit 6 reads, from the commodity master file storage 51, data such as unit prices, existing total numbers of sales and so forth of commodities. These commodities have the same commodity codes as the commodity codes temporarily stored in the read data temporarily storing unit 12.

The commodity information of the commodities handled in the relevant transaction, which information has been thus obtained from the read data temporarily storing unit 12, and the commodity information which has been obtained from the commodity master file storage 51 as described above is used as described below. Based on the commodity information, the total numbers of sales, total money amounts of sales, and so forth of the commodities are calculated. The results of the calculation are then transferred to the commodity master producing control unit 5.

The control unit 5, based on the thus-transferred calculation results, updates the total numbers of sales, total money amounts of sales, and so forth of the commodities handled for the relevant transaction, which total numbers of sales and total money amounts of sales are those recorded in the commodity master files stored in the commodity master file storage 51. The thus-updated results are displayed on the display unit 31. Further, if necessary, the updated results are printed out through the printing unit 41.

Thus, according to the commodity management system in the embodiment of the present invention, when commodity stocking/shipping, order receiving/ordering, or sales is managed, the commodity management can be easily executed, by merely reading the commodity information through the two-dimensional bar code reader 11. Thus, any data communication with a higher hierarchy system is not required for the commodity management. As a result, great labor saving can be achieved in the commodity management.

Further, after the commodity master files have been already produced, another method can be used in the commodity management. That is, in the commodity management, reading of the two-code bar code labels adhered to the commodities is not performed. Instead, necessary commodity information of relevant commodities is obtained from the already produced commodity master files. Only numbers of commodities handled for the relevant transaction are input through the keyboard unit 21. Thus, the commodity management is executed.

With reference to FIG. 7, an example of a commodity master file stored in the commodity master file storage 51 will now be described. The example shown in FIG. 7 is the commodity master file for managing books. Such a commodity master file may be referred to as a book master file, hereinafter. As shown in the figure, in order to manage books, a lot of commodity information such as book codes (ISBN codes), JAN codes, book names, publishing companys' names, numbers of sales and so forth is required. In the book master file, the necessary commodity information such as the book code, JAN code, and so forth is recorded for each book.

In the commodity management system in the embodiment of the present invention, such a large amount of commodity information is converted into the two-dimensional bar codes. The thus-obtained two-dimensional bar codes are printed on book labels which are interleaved in books by the publishing companies who print the books, or printed on covers, ribbons or the like attached to the books.

Sections in the book master file shown in FIG. 7, in which the words "NUMBER OF SALES" are indicated in FIG. 7, have the current total numbers of sales of the respective books recorded therein. Each of the numbers of sales is a number of copies of the book which have been sold. It is also possible for these sections to be sections of "NUMBER OF STOCK". In this case, the numbers of stock recorded in the sections are subtracted from numbers of sales for each transaction. Each number of the numbers of stock is a number of copies of the book which have been stocked. Further, it is also possible for a section of "MONEY AMOUNT OF SALES" not shown in FIG. 7 to record the current total money amount of sales is additionally provided for each book to the book master file shown in FIG. 7.

In a book selling company or in a retail store, book master files such as that shown in FIG. 7 are produced using the two-dimensional bar code reader 11 shown in FIG. 6. The bar code reader 11 is used to scan once the two-dimensional bar code printed on a book label or on a book cover of a book. As a result, the book master file can be produced and it also can be updated. Thus, the commodity management can be executed easily.

Figure 2:
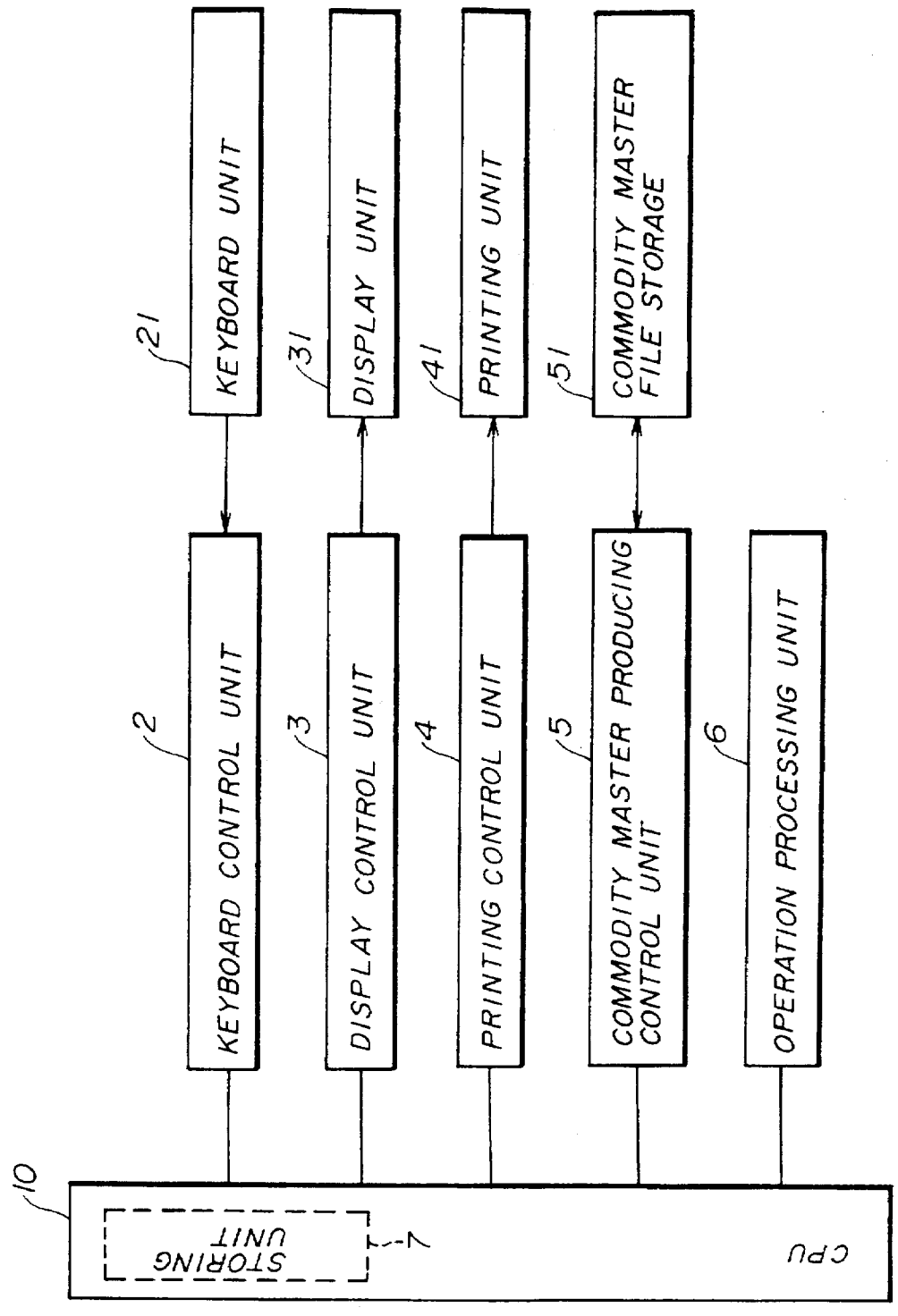
FIG. 2 shows a block diagram illustrating essential elements of a commodity management apparatus of the commodity management system shown in FIG. 1.
Figure 3:
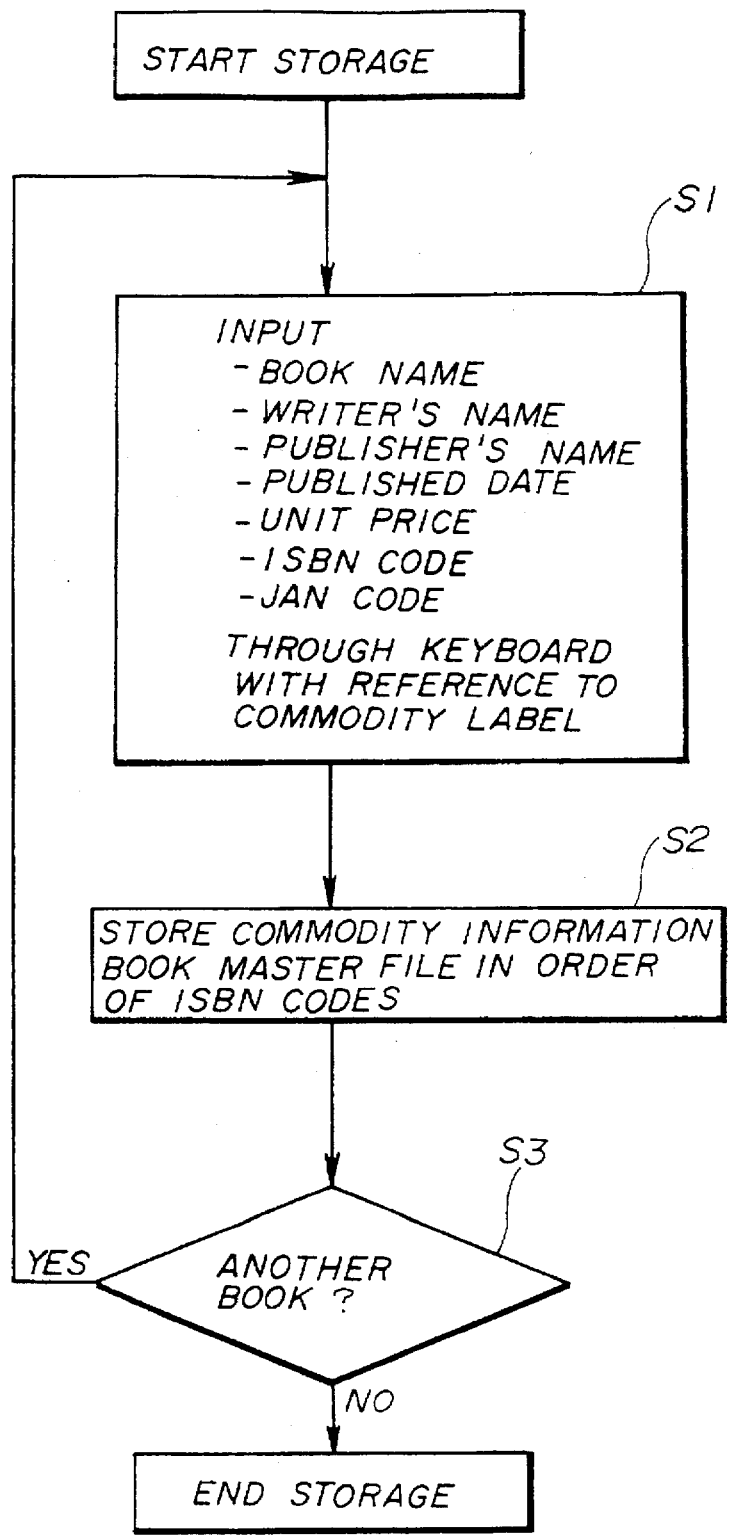
FIG. 3 shows an operation flow chart illustrating an operation for producing a document master file in the commodity management apparatus shown in FIG. 2.
Figure 8:
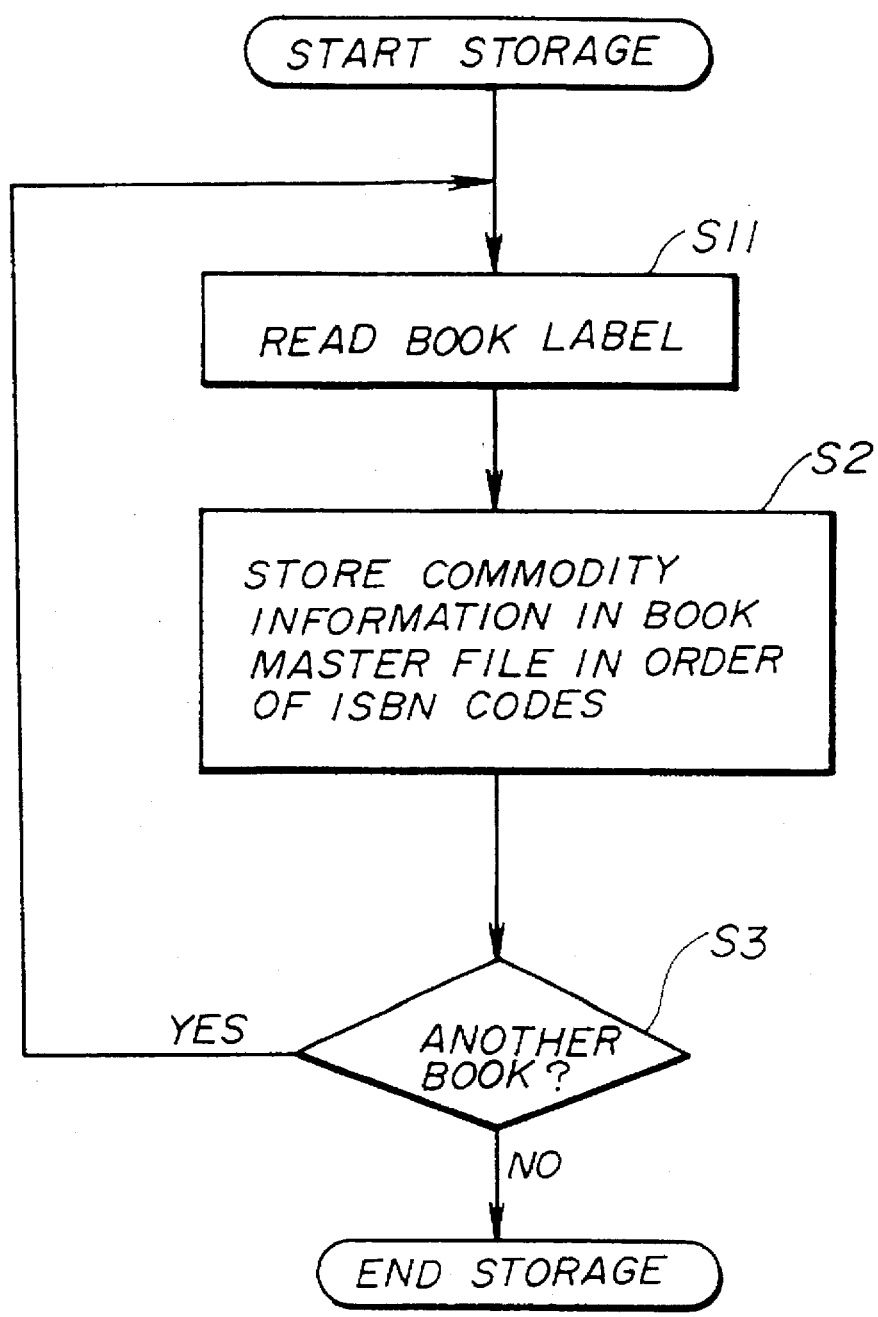
FIG. 8 shows an operation flow chart illustrating an operation for producing a document master file in the commodity management apparatus shown in FIG. 6.

With reference to FIG. 8, an operation flow in producing the commodity master file for managing, for example, books in the commodity management apparatus 300 in the embodiment of the present invention, will now be described. When the structure shown in FIG. 8 is compared with that shown in FIG. 2, as shown in FIG. 2, the input of the commodity information is executed manually in the step S1 in the system in the related art shown in FIG. 1, while the input of the commodity information is executed through the two-dimensional bar code reader 11 in a step S11 in the system in the embodiment of the present invention shown in FIG. 5.

In the commodity management system in the embodiment of the present invention shown in FIG. 5, commodity information reading using the two-dimensional bar code reader 11 can be performed instantaneously. Further, subsequently performed commodity information processing operations are performed automatically. The commodity information processing operations includes commodity information recognition operation, an operation for storing the thus-recognized commodity information into the commodity master file storage, and an operation for sorting the thus-stored commodity information according to an order of codes. Thus, it is possible to greatly reduce labor in the commodity information inputting process.

In the flow chart shown in FIG. 8, a step S3 is executed as a result of an operator appropriately operating the keyboard of the keyboard unit 21. If the inputting process for the commodity information, which information must be stored in the commodity management apparatus 300, has been completed for all books, that is, if a registering operation has been finished, the operator may press a completion key provided in the keyboard. Thus, the commodity management apparatus 300 terminates the commodity information inputting process.

If an operator wishes to have a relevant list output from the commodity management apparatus 300, the operator may press an appropriate key provided in the keyboard in the step S3. Thus, the relevant list is output from the apparatus 300.

In the commodity management system in the embodiment of the present invention, all necessary commodity information can be converted into the two-dimensional bar codes. Therefore, by reading the two-dimensional bar codes, all information, required for producing the commodity master file of books (book master file), such as book codes, JAN codes, commodity codes, book names, writers' names, prices, publishing companys' names, and published dates can be easily input.

The thus-input bar code data is converted into character information and identified so that the data is classified into various sorts of commodity information such as book codes, JAN codes, commodity codes, book names, writers' names, prices, publishing companys' names, and published dates. In order to enable such data identifying, for example, when the commodity information is recorded as a form of the two-dimensional bar code, relevant identifier information may also be additionally recorded in front of each particular piece of the commodity information. The relevant identifier information indicates which sort the particular piece of commodity information is. By using such identifier information, the data identifying is executed after the two-dimensional bar codes have been read.

The thus-identified and classified data is recorded in appropriate sections of the commodity master files. Thus, the commodity master files such as that shown in FIG. 7 are produced. Further, it is also possible for the commodity information stored in the book master file for each book to be sorted in the order according to the book codes.

Specifically, the book code of a new book, commodity information of which will be recorded in the book master file, is compared, one by one, with the book codes of the books, the commodity information of which has been already recorded in this book master file. Thus, the commodity information of the new book is recorded in the book master file in a position such that the resulting book master file has the commodity information arranged in the order of the book codes. The sorting of the commodity information recorded in the book master file is not limited to the sorting according to the order of book codes. Sorting according to the order of writers' names, publishing companys' names or the like may be performed regarding the commodity information of the book master file.

Commodities managed in the commodity management system in the embodiment of the present invention are not limited to books. Any other sort of commodities, such as that handled in a supermarket, can be managed in the same system in a similar way.

With reference to FIGS. 10, 11A, 11B, 12 and 13, an example of a process in which the commodity management system in the embodiment of the present invention is actually used when books are stocked in a book store and a book is sold by the same book store will now be described. In this example, a personal computer acts as the commodity management apparatus 300 and a PLU (Price Look-Up table) master file storage acts as the commodity master file storage 51.

Figure 11A:
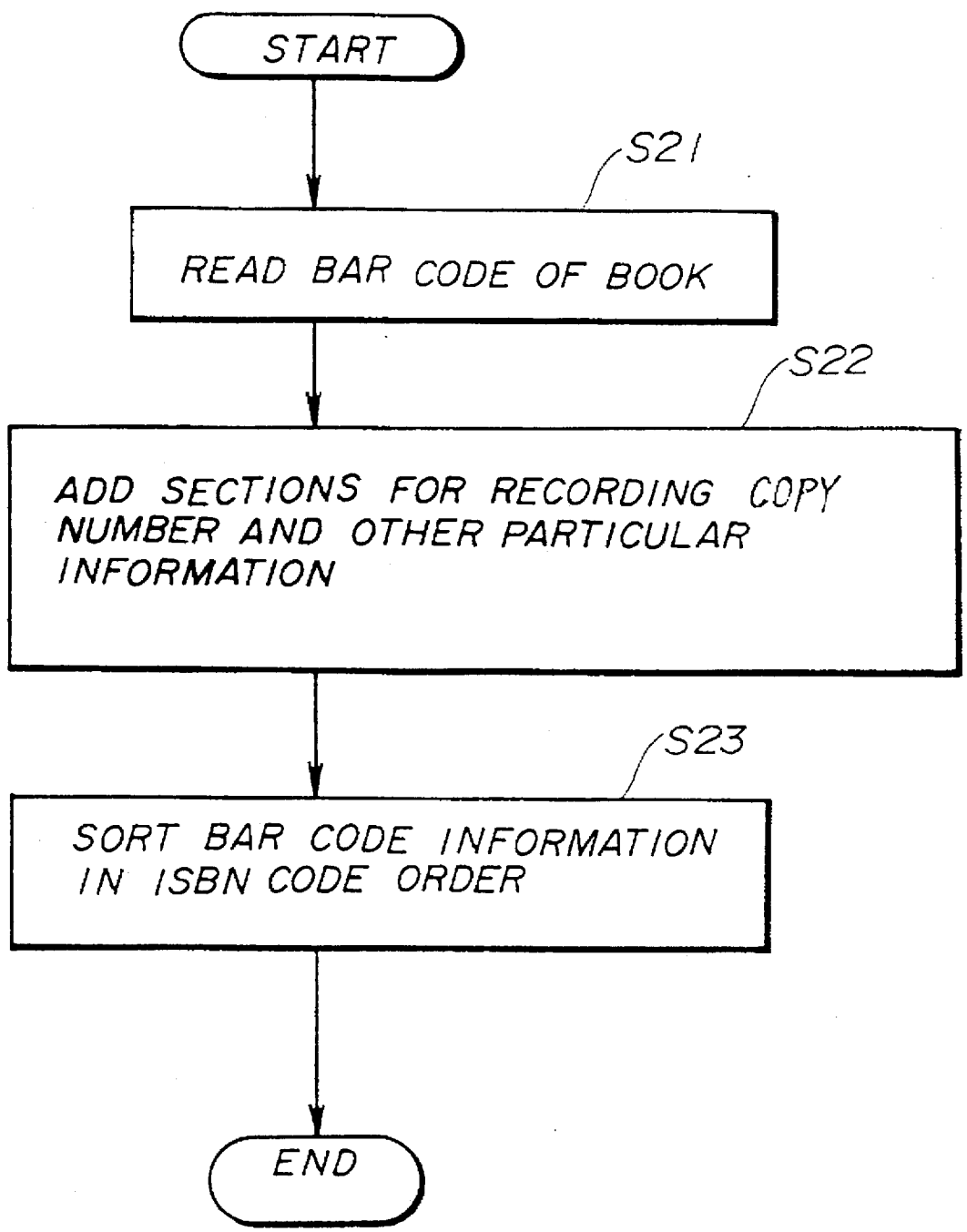

With reference to FIGS. 10, 11A and 11B, the process performed when books are stocked in the book store will now be described. In a step 21 shown in FIG. 11A, the two-dimensional bar codes 101 provided on books shown in FIG. 10 are, one by one, read through the two-dimensional bar code reader 11. The thus-read data is stored in the PLU master storage 51 so that the commodity information for each book has 7 sections of data, as shown in FIG. 10, the sections having an ISBN code, a JAN code, a book name, a writer's name, a publishing company's name, a published date, and a price recorded therein, respectively.

In a step S22, a eighth section and a last section (hatched in FIG. 10) are added subsequent to the above-mentioned seven (7) sections for each book, the eighth section being used for recording a number of copies of the book sold and the last section being used for recording other particular information. Thus, a price look-up table acting as the book master file is produced in the storage 51 as shown in FIG. 10.

In a step S23, the sorting operation is performed such that the commodity information of the books is arranged according to the ISBN code order in the price look-up table stored in the storage 51. A specific sorting operation in the step S23 will now be described with reference to FIG. 11B. In a step S201, an ISBN code read in the step 21 is compared with an ISBN code recorded in the top line of the existing price look-up table. If a number of the read ISBN code is smaller than a number of the existing ISBN code in a step S201, a step S202 is executed. Thus, an ISBN code of a second (i.e., next successive) line of the existing price look-up table is checked. In the step S201, the ISBN code read in the step 21 is compared with this second line ISBN code. The steps S201 and S202 are repeated until a number of the read ISBN code is equal to or larger than a currently checked number of the existing ISBN code in the step S201. If the number of the read ISBN code is equal to or larger than the currently checked number of the existing ISBN code in the step S201, a step S203 is executed. In the step S203, the commodity information including the read ISBN data is inserted immediately as a line after the currently checked line of the price look-up table.

Figure 12:
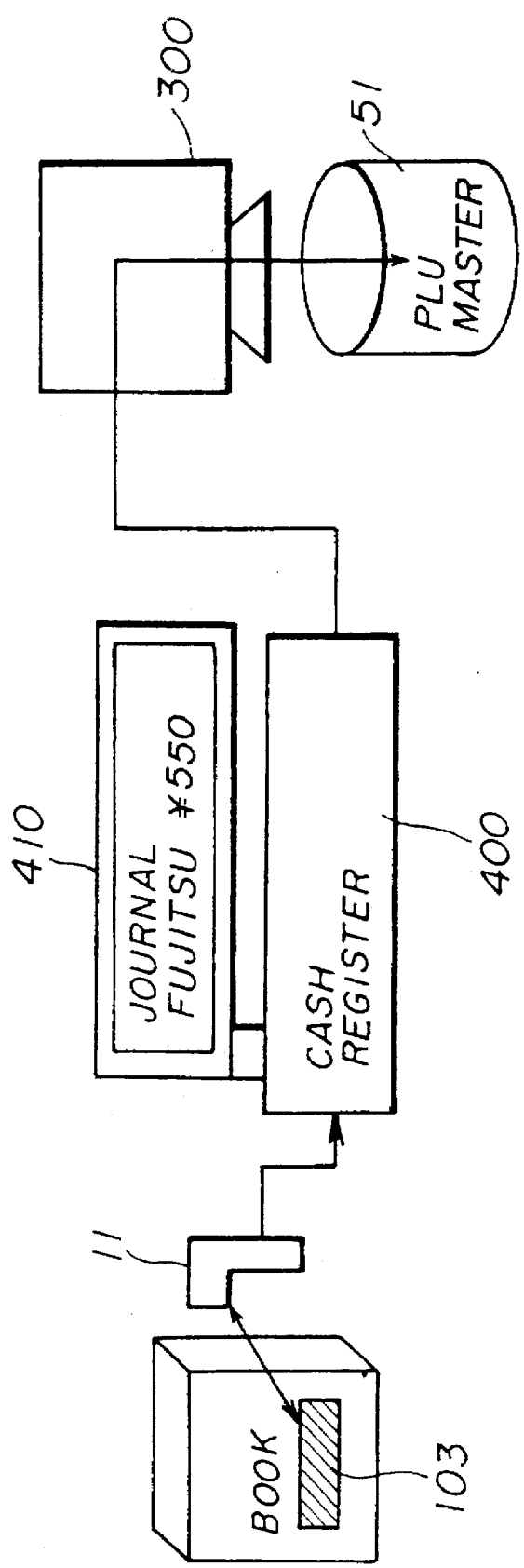
Figure 13:
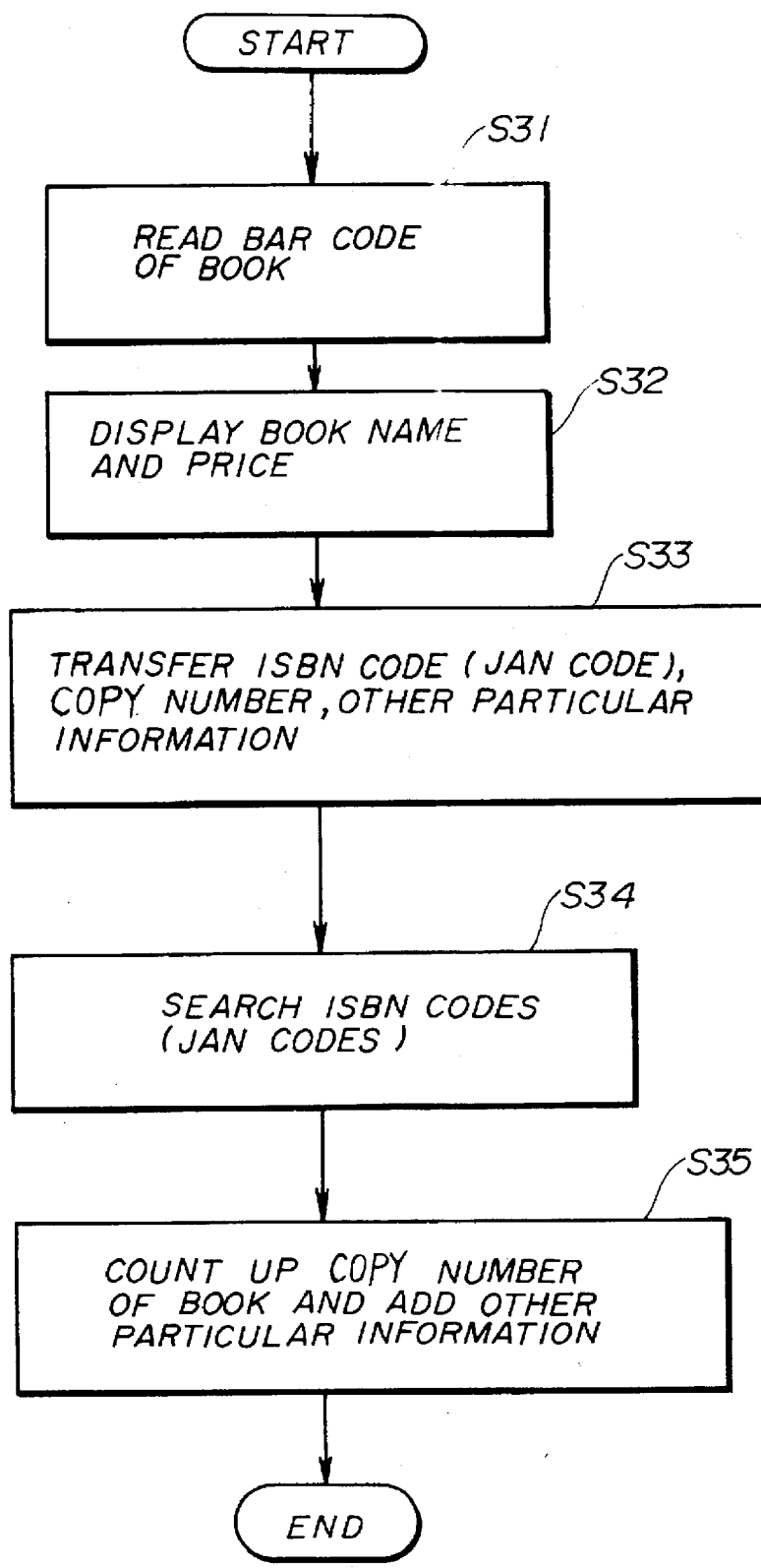

With reference to FIGS. 12 and 13, the process performed when a book stocked in the book store is sold will now be described. In a step S31 shown in FIG. 13, the two-dimensional bar code 101 provided on the book shown in FIG. 12 is read through the two-dimensional bar code reader 11. In a step S32, using the thus-read bar code data, a display device 410 of a cash register 400 displays a book name "JOURNAL FUJITSU" and a book price "¥ 550" of the book as shown in FIG. 12. In a step S33, the ISBN code (or JAN code) in the bar code data, a number of copies of the book sold up now and other particular information, if any, is transferred to the personal computer 300. The number of copies of the book sold up now and the other particular information, if any, is input through a keyboard provided in the cash register 400 by an operator when the book is sold.

In a step S34, the personal computer 300 searches the ISBN codes (or JAN codes) stored in the price look-up table in the storage 51 for the ISBN code (or JAN code) which has been thus transferred. Thus, the commodity information for the book being sold now is retrieved from the price look-up table. In a step S35, the personal computer 300 counts up the number of copies of the book recorded in the eighth section in the thus-retrieved commodity information based on the number of copies of the book sold up now. Further in the step S35, the other particular information, if any, is recorded into the last section of this commodity information. Thus, the price look-up table is updated in response to selling the book.

Further, positions at which the two-dimensional bar codes indicating the commodity information and to be used by the commodity management system in the embodiment of the present invention are provided, are not limited to the commodities themselves. For example, it is possible for the two-dimensional bar code labels indicating the commodity information and to be used by the commodity management system in the embodiment of the present invention to be adhered to columns or walls located in commodity stock positions such as columns or walls of commodity stock shelves.

Further, it is convenient that the commodity management apparatus 300 has a structure such that data registered in the commodity management apparatus 300 can be directly transferred, if necessary, to a higher hierarchy apparatus which is located in a shipping base, a distributing base or the like.

Further, by forming the commodity management apparatus 300 as a portable terminal, it is possible to save space. As a result, work efficiency with regard to the commodity management work can be greatly improved.

Thus, by using the commodity management system in the embodiment of the present invention, the following advantages are obtained: Essential commodity information can be collectively indicated (through the two-dimensional bar codes) on commodities by a manufacturer when the commodities are shipped. All items of the commodity information indicated on a commodity can be read by an operator merely performing scanning operation once. Thus, great labor saving and great time saving is achieved.

Further, because manual inputting of commodity information such as that using a keyboard can be eliminated, erroneous inputting can be eliminated. Therefore, checking of inputting results and correcting the erroneous inputting can be eliminated. Thus, the inputting results do not have to partly depend on the skill of a particular operator.

Further, the commodity management apparatus 300 does not need a host apparatus to be connected thereto so as to perform data communication between the commodity management apparatus and the host apparatus. Therefore, it is possible to form the commodity management apparatus 300 as a portable terminal device. As a result, the commodity management apparatus is convenient and thus operation of the apparatus can be easily executed.

Further, the present invention is not limited to the above-described embodiments, and variations and modifications may be made without departing from the scope of the present invention.

What is claim is:

1. A commodity management system for managing commodities of plural different types, each commodity unit having a two-dimensional bar code pattern thereon storing coded commodity information characterizing the commodity unit in each of plural, prescribed information categories, the prescribed information categories being common to all of the plural, different types of commodities and the commodity units of a common type having respective two-dimensional bar code patterns thereon storing the respective two-dimensional bar code patterns thereon storing the same coded information, the commodity management system comprising:

a master file storage;

an optical reader reading the coded commodity information of the two-dimensional bar code pattern of each selected commodity unit, of the plural, different commodity units managed by the commodity management system, and supplying the read, coded commodity information to, and for storage in, the master file storage;

a data input unit inputting related information for each selected commodity unit and supplying the input, related information to the master file storage for storage therein in association with the coded commodity information read from the two-dimensional bar code pattern for the corresponding selected commodity unit and stored in the master file storage; and a data sorter sorting the read and stored coded commodity information and controlling the storage of the sorted, coded commodity information in the master file storage in a prescribed order and in accordance with a selected one of the prescribed information categories thereof.

2. A system as recited in claim 1, wherein the plural different types of commodities are characterized by respective, different coded commodity information relatable in an ordered sequence and wherein the data sorter further comprises:

an accessing unit accessing the master file storage to determine the order of previously read and stored, coded commodity information of the plural different types of selected commodities and entering the scanned, coded commodity information of a currently selected and scanned commodity unit in the master file storage in the ordered sequence of the previously read and stored coded commodity information of the previously selected and scanned commodity units.

3. A system as recited in claim 1, wherein:

the coded commodity information comprises respective, numerical codes stored in the master file storage in a numerically ordered sequence; and the accessing unit enters the scanned, coded commodity information of a currently selected and scanned commodity unit in the ordered sequence.

4. A system as recited in claim 1, further comprising:

a commodity storage unit; and the related information comprises a number of commodity units, of a common commodity type, as currently maintained in the commodity storage.

5. A system as recited in claim 1, further comprising:

a commodity storage unit; and the related information comprises a number of commodity units withdrawn from the commodity storage unit.

6. A system as recited in claim 1, wherein the master file comprises a price look up master file and the related information for each commodity unit comprises the unit price of each commodity unit.

* * * * *